(12) United States Patent
Comte

(10) Patent No.: US 10,836,680 B2
(45) Date of Patent: Nov. 17, 2020

(54) YOSHIOKAITE GLASS-CERAMICS OBTAINED FROM GLASS FRITS

(71) Applicant: Corning Incorporated, Corning, NY (US)

(72) Inventor: Marie Jacqueline Monique Comte, Fontenay aux Roses (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/108,989

(22) Filed: Aug. 22, 2018

(65) Prior Publication Data

US 2019/0062218 A1 Feb. 28, 2019

Related U.S. Application Data

(60) Provisional application No. 62/552,657, filed on Aug. 31, 2017.

(51) Int. Cl.
C03B 32/02 (2006.01)
C04B 35/44 (2006.01)
C03C 3/062 (2006.01)
C03C 13/06 (2006.01)
C04B 35/22 (2006.01)
C03C 10/00 (2006.01)
C03C 8/02 (2006.01)

(52) U.S. Cl.
CPC .............. C04B 35/44 (2013.01); C03C 3/062 (2013.01); C03C 10/0036 (2013.01); C03C 13/06 (2013.01); C04B 35/22 (2013.01); C03C 8/02 (2013.01)

(58) Field of Classification Search
CPC ............................ C03C 10/0036; C03C 8/02
See application file for complete search history.

(56) References Cited

U.S. PATENT DOCUMENTS

| 4,755,489 A | 7/1988 | Chyung et al. |
| 2005/0221068 A1* | 10/2005 | Nonoue ................. B32B 18/00 428/209 |
| 2015/0210598 A1 | 7/2015 | Tomosue et al. |

OTHER PUBLICATIONS

Backhaus-Ricoult et al; "Glass Ceramic Composites With Metal Network and Manufacturing Methods for Glass Ceramic Comosites"; Filed as PCT/US2018/048962 on Aug. 30, 2018; 96 Pages.

(Continued)

Primary Examiner — Karl E Group
(74) Attorney, Agent, or Firm — Amy T. Lang; John P. McGroarty

(57) ABSTRACT

A glass ceramic material is disclosed that includes a residual glass, and a crystalline phase that includes a yoshiokaite phase. The yoshiokaite phase constitutes a main crystalline phase of the glass ceramic material. A method for making a glass ceramic material is also disclosed that includes heat treating frit glass to form the glass ceramic material, wherein the frit glass comprises: $SiO_2$ from 15 mol % to 37 mol %; $Al_2O_3$ from 40 mol % to 47 mol %; and CaO from 20 mol % to 30 mol %.

10 Claims, 3 Drawing Sheets

(56) References Cited

OTHER PUBLICATIONS

International Search Report and Written Opinion PCT/US2018/048966 dated Nov. 14, 2018, 10 pgs.
Strukelj et al. "Effect of zirconium on the structure of a supercooled calcium aluminosilicate melt," Journal of the American Ceramic Society, 98(6) Jun. 2015, pp. 1942-1950.
Roskosz et al. "Nucleation mechanisms: A crystal-chemical investigation of phases forming in highly supercooled aluminosilicate liquids," Journal of Non-Crystalline Solids, 351(14-15) May 2005, pp. 1266-1282.

* cited by examiner

YOSHIOKAITE GLASS-CERAMICS OBTAINED FROM GLASS FRITS

This application claims the benefit of priority under 35 U.S.C. § 119 of U.S. Provisional Application Ser. No. 62/552,657 filed on Aug. 31, 2017 the content of which is relied upon and incorporated herein by reference in its entirety.

BACKGROUND

Field

The present specification generally relates to glass ceramics and, more specifically, to Yoshiokaite glass ceramics.

Technical Background

Yoshiokaite is a rare mineral phase comprising aluminum, calcium, silicon, and oxygen. However, yoshiokaite generally crystallizes from the surface of the bulk glass. Thus, while small amounts of the yoshiokaite phase have been produced at the surface of the bulk glass, the formation of a glass ceramic having a yoshiokaite main crystalline phase were not heretofore known.

Generally, glass ceramics are obtained from bulk glasses and internal nucleation is obtained by adding nucleating agents the bulk glass. However, it is not known how to cause a glass bulk comprising alumina, calcium oxide, and silica to nucleate internally to form a yoshiokaite main phase. Thus, as stated above, when attempting to form a glass ceramic having a yoshiokaite phase, only small amounts of the yoshiokaite phase is formed at the surface of the bulk glass, and internal nucleation does not occur.

Accordingly, a need exists for glass ceramics comprising yoshiokaite as a main phase and methods for forming glass ceramics with yoshiokaite as a main phase.

SUMMARY

According to one embodiment, a glass ceramic material comprises an amorphous glass phase, and a crystalline phase comprising a yoshiokaite phase. The yoshiokaite phase constitutes a main crystalline phase of the glass ceramic material.

In another embodiment, a method for forming a glass ceramic material comprises: heat treating frit glass to form the glass ceramic material, wherein the frit glass comprises: $SiO_2$ in a range from greater than or equal to 15 mol % to less than or equal to 37 mol %; $Al_2O_3$ in a range from greater than or equal to 40 mol % to less than or equal to 47 mol %; and CaO in a range from greater than or equal to 20 mol % to less than or equal to 30 mol %; and wherein the glass ceramic material comprises: an amorphous glass phase; and a crystalline phase comprising a yoshiokaite phase, wherein the yoshiokaite phase constitutes a main crystalline phase of the glass ceramic material.

In another embodiment, an electronic device, comprises: electrical components; and a glass ceramic material component electrically connected to the electrical components, wherein the glass ceramic material comprises: a residual glass; and a crystalline phase comprising a yoshiokaite phase, wherein the yoshiokaite phase constitutes a main crystalline phase of the glass ceramic material.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
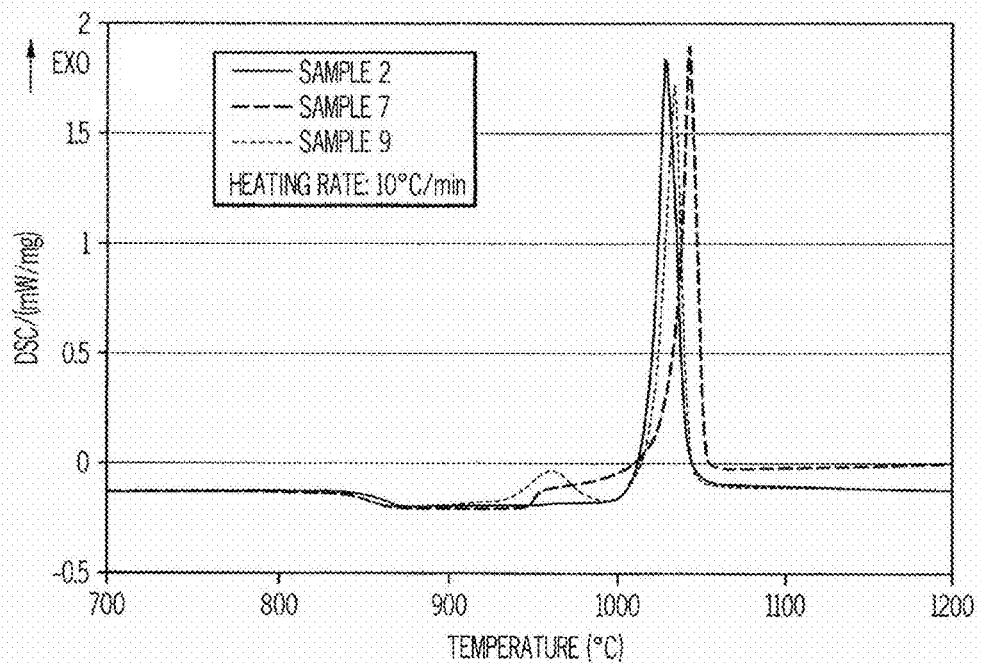
FIG. 1 is a DSC curve of glass ceramics according to embodiments disclosed and described herein.

Reference will now be made in detail to embodiments of glass ceramics comprising yoshiokaite as a main phase, and to methods for making such glass ceramics. In one embodiment, a glass ceramic material comprises an amorphous glass phase, and a crystalline phase comprising a yoshiokaite phase. The yoshiokaite phase constitutes a main crystalline phase of the glass ceramic material.

Glass ceramics according to one or more embodiments disclosed and described herein comprise yoshiokaite as the main crystalline phase. As used herein, the term "main crystalline phase" refers to the crystalline phase that is present in the glass ceramic in the highest percentage relative to other crystalline phases. As an example, in a glass ceramic where there are two crystalline phases, the main crystalline phase will present in an amount of at least 50.1 wt. %. As another example, in a glass ceramic where there are three crystalline phases, the main crystalline phase will be present in an amount of at least 33.4 wt. %. It should be understood that in embodiments, the yoshiokaite main crystalline phase will be present in the glass ceramic in amounts greater than the minimum amounts described above. In addition to a yoshiokaite crystalline phase, glass ceramics according to some embodiments, may include other crystalline phases. These other crystalline phases may include, for example, anorthite, gehlenite, nepheline, and cubic zirconia. In some embodiments, minor crystalline phases may be present in the glass ceramic in amounts less than 6 wt. %. These minor crystalline phases include, for example, corundum, cristobalite, and quartz. It should be understood that various crystalline phases described above will only be present in the glass ceramic if additional components are added to the precursor materials either intentionally or as impurities. For example, a nepheline crystalline phase will only be present when $Na_2O$ is included in the precursor glass. Likewise, a cubic zirconia crystalline phase will only be present where $ZrO_2$ is included in the precursor glass. Various crystalline phases that may be present in the glass ceramics according to embodiments will be described below.

Yoshiokaite comprises the main crystalline phase of glass ceramics according to embodiments. Yoshiokaite has a trigonal-rhombohedral structure comprising aluminum, calcium, silicon, and oxygen. Yoshiokaite structure is believed to be derived from tridymite. It forms a solid solution with formula $Ca_{8-x/2}\square_{x/2}Al_{16-x}Si_xO_{32}$ and, in embodiments, has a composition close to $Ca_{5.5}Al_{11}Si_5O_{32}$. Yoshiokaite crystals were first discovered as a lunar element that is believed to have been formed by tremendous thermal shock of aluminum-rich tridymite-like minerals found on the moon. Since its discovery, attempts have been made to synthetically reproduce yoshiokaite and glass ceramics comprising yoshiokaite as a main crystalline phase. However, obtaining a glass-ceramic containing yoshiokaite as main crystalline phase has proven to be problematic. Specifically, it has been found that bulk glass comprising aluminum, calcium, silicon, and oxygen crystallize at the surface of the bulk glass. Thus, internal nucleation of a bulk glass comprising aluminum, calcium, silicon, and oxygen to a yoshiokaite structure is difficult to achieve, and nucleating agents that promote such internal nucleation have not been found. However, according to embodiments disclosed and described herein, a glass ceramic having a yoshiokaite main crystalline phase may be formed from glass frit that are submitted to a specific thermal treatment to form a strongly crystallized structure using surface nucleation, as will be discussed in more detail below.

Glass ceramics according to embodiments disclosed and described herein comprise the yoshiokaite phase as a main crystalline phase of the glass ceramic. In one or more embodiments, the yoshiokaite crystalline phase comprises greater than or equal to 55 wt. % of the crystalline phase in the glass ceramic. In other embodiments, the yoshiokaite crystalline phase comprises greater than or equal to 80 wt. % of the crystalline phase in the glass ceramic, such as greater than or equal to 85 wt. % of the crystalline phase in the glass ceramic, greater than or equal to 90 wt. % of the crystalline phase in the glass ceramic, or greater than or equal to 95 wt. % of the crystalline phase in the glass ceramic.

The size of the yoshiokaite crystals in the yoshiokaite crystalline phase is not particularly limited, but in some embodiments, the mean size of the yoshiokaite crystals measured by a Riteveld analysis of the XRD spectrum is greater than or equal to 100 nm to less than or equal to 160 nm, such as from greater than or equal to 110 nm to less than or equal to 160 nm, from greater than or equal to 120 nm to less than or equal to 160 nm, from greater than or equal to 130 nm to less than or equal to 160 nm, from greater than or equal to 140 nm to less than or equal to 160 nm, or from greater than or equal to 150 nm to less than or equal to 160 nm. In other embodiments, the yoshiokaite crystals may have a major dimension from greater than or equal to 100 nm to less than or equal to 150 nm, such as from greater than or equal to 100 nm to less than or equal to 140 nm, from greater than or equal to 100 nm to less than or equal to 130 nm, from greater than or equal to 100 nm to less than or equal to 120 nm, or from greater than or equal to 100 nm to less than or equal to 110 nm and all ranges and subranges therebetween.

Glass ceramic according to some embodiments may comprise an anorthite phase that is present in amounts less than the yoshiokaite phase. Anorthite has a triclinic structure comprising calcium, aluminum, silicon, and oxygen. Anorthite has a composition of $CaAl_2Si_2O_8$. Without being bound to any particular theory, it is believed that yoshiokaite is a metastable phase that generally crystallizes in a temperature range from about 900° C. to about 1050° C. If the thermal treatment is conducted at higher temperatures, the yoshiokaite phase transforms to stable phases such as anorthite and gehlenite.

Glass ceramics according to embodiments disclosed and described herein comprise the anorthite phase in amounts less than or equal to 30 wt. % of the crystalline phase in the glass ceramic, such as less than or equal to 25 wt. % of the crystalline phase in the glass ceramic, less than or equal to 20 wt. % of the crystalline phase in the glass ceramic, less than or equal to 15 wt. % of the crystalline phase in the glass ceramic, less than or equal to 10 wt. % of the crystalline phase in the glass ceramic, or less than or equal to 5 wt. % of the crystalline phase in the glass ceramic.

Glass ceramics according to embodiments disclosed and described herein comprise the gehlenite phase in amounts less than or equal to 30 wt. % of the crystalline phase in the glass ceramic, such as less than or equal to 25 wt. % of the crystalline phase in the glass ceramic, less than or equal to 20 wt. % of the crystalline phase in the glass ceramic, less than or equal to 15 wt. % of the crystalline phase in the glass ceramic, less than or equal to 10 wt. % of the crystalline phase in the glass ceramic, or less than or equal to 5 wt. % of the crystalline phase in the glass ceramic.

Glass ceramic according embodiments may comprise a gehlenite phase that is present in amounts less than the yoshiokaite phase. Gehlenite has a tetragonal structure comprising calcium, aluminum, silicon, and oxygen. Gehlenite has a composition of $Ca_2Al(AlSiO_7)$. In one or more embodiments, the gehlenite phase may be present as a solid solution with akermanite, which has the composition of $Ca_2Mg(Si_2O_7)$, while still having a tetragonal structure. The akermanite component will only be formed in embodiments where magnesium is introduced into the precursor materials either intentionally or as an impurity or trace component. It should be understood that to remain classified as gehlenite, the amount of akermanite in the solid solution is relatively low, such as, in some embodiments, less than or equal to 5 wt. %, less than or equal to 4 wt. %, less than or equal to 3 wt. %, or less than or equal to 2 wt. %. Without being bound to any particular theory, it is believed that although yoshiokaite is a metastable phase that generally crystallizes in a temperature range from about 900° C. to about 100° C., if the thermal treatment is conducted at higher temperatures, the yoshiokaite phase transforms to gehlenite.

In some embodiments, the glass ceramic may comprise a nepheline phase that is present in amounts less than the yoshiokaite phase. Nepheline has a hexagonal structure. Nepheline has a composition of $(Na,K)AlSiO_4$. In some instances, the nepheline solid solution minerals are hexagonal ($P6_3$) tectosilicates whose structures are "stuffed" derivatives of the β-tridymite form of silica. The general formula of such hexagonal ($P6_3$) tectosilicates is $R(Al,Si,B)O_4$, where R=Na,K,Ca or a vacancy. It should be understood that nepheline phases will only be present in glass ceramics where $Na_2O$ were included in the precursor glass either intentionally or unintentionally as an impurity or trace component.

Glass ceramics according to embodiments disclosed and described herein comprise the nepheline phase in amounts less than or equal to 30 wt. % of the crystalline phase in the glass ceramic, such as less than or equal to 25 wt. % of the crystalline phase in the glass ceramic, less than or equal to 20 wt. % of the crystalline phase in the glass ceramic, less than or equal to 15 wt. % of the crystalline phase in the glass ceramic, less than or equal to 10 wt. % of the crystalline phase in the glass ceramic, or less than or equal to 5 wt. % of the crystalline phase in the glass ceramic.

In some embodiments, the glass ceramic may comprise a cubic zirconia phase that is present in amounts less than the yoshiokaite phase. Cubic zirconia is the crystalline phase of $ZrO_2$, and has a cubic structure. It should be understood that cubic zirconia phase will only be present in glass ceramics where $ZrO_2$ is included in the precursor glass either intentionally or unintentionally as an impurity or trace component.

Glass ceramics according to embodiments disclosed and described herein comprise the cubic zirconia phase in amounts less than or equal to 15 wt. % of the crystalline phase in the glass ceramic, such as less than or equal to 10 wt. % of the crystalline phase in the glass ceramic, or less than or equal to 5 wt. % of the crystalline phase in the glass ceramic.

In one or more embodiments, the glass-ceramic articles may include one or more minor phases that comprise less than 6 wt. % of the crystalline structure of the glass ceramic, such as less than 5 wt. % of the crystalline structure of the glass ceramic, less than 4 wt. % of the crystalline structure of the glass ceramic, less than 3 wt. % of the crystalline structure of the glass ceramic, less than 2 wt. % of the crystalline structure of the glass ceramic, or less than 1 wt. % of the crystalline structure of the glass ceramic. Included in these minor components, according to some embodiments, are corundum and cristobalite, which may be formed upon heat treating. Corundum is the crystalline form of aluminum oxide that has a trigonal structure. Cristobalite is the crystalline form of silica and has a tetragonal structure.

Glass ceramics according to embodiments may comprise one or more of the above crystalline phases in addition to yoshiokaite as the main crystalline phase. The glass ceramics primarily include crystalline phases and only include small amounts of the residual glass. The amount of residual glass is generally small because the crystals have a composition very close to the composition of the base glass. In one or more embodiments, the glass ceramics comprise greater than or equal to 80 wt. % crystalline phase, such as greater than or equal to 85 wt. % crystalline phase, greater than or equal to 90 wt. % crystalline phase, greater than or equal to 95 wt. % crystalline phase, or greater than or equal to 98 wt. % crystalline phase. Accordingly, in embodiments, the glass ceramic includes less than or equal to 20 wt. % of a residual glass, such as less than or equal to 15 wt. % of a residual glass, less than or equal to 10 wt. % of a residual glass, less than or equal to 5 wt. % of a residual glass, or less than or equal to 2 wt. % of a residual glass.

Having a glass ceramic composition with a sufficient difference between the glass transition temperature ($T_g$) and the temperature of crystallization allow for a glass ceramic with a high density and low porosity. The composition of the glass ceramic can also have an effect on the density of a glass ceramic. In some embodiments, the density of the glass ceramic may be greater than or equal to 2.0 g/cm³, such as greater than or equal to 2.2 g/cm³, greater than or equal to 2.4 g/cm³, greater than or equal to 2.6 g/cm³, greater than or equal to 2.8 g/cm³, or greater than or equal to 3.0 g/cm³. In one or more embodiments, the density of the glass ceramic may be from greater than or equal to 2.0 g/cm³ to less than or equal to 3.0 g/cm³, such as greater than or equal to 2.1 g/cm³ to less than or equal to 3.0 g/cm³, greater than or equal to 2.2 g/cm³ to less than or equal to 3.0 g/cm³, greater than or equal to 2.3 g/cm³ to less than or equal to 3.0 g/cm³, greater than or equal to 2.5 g/cm³ to less than or equal to 3.0 g/cm³, greater than or equal to 2.6 g/cm³ to less than or equal to 3.0 g/cm³, greater than or equal to 2.7 g/cm³ to less than or equal to 3.0 g/cm³, greater than or equal to 2.8 g/cm³ to less than or equal to 3.0 g/cm³, or greater than or equal to 2.9 g/cm³ to less than or equal to 3.0 g/cm³. In other embodiments, the density of the glass ceramic is from greater than or equal to 2.0 g/cm³ to less than or equal to 2.9 g/cm³, such as greater than or equal to 2.0 g/cm³ to less than or equal to 2.8 g/cm³, greater than or equal to 2.0 g/cm³ to less than or equal to 2.7 g/cm³, greater than or equal to 2.0 g/cm³ to less than or equal to 2.6 g/cm³, greater than or equal to 2.0 g/cm³ to less than or equal to 2.5 g/cm³, greater than or equal to 2.0 g/cm³ to less than or equal to 2.4 g/cm³, greater than or equal to 2.0 g/cm³ to less than or equal to 2.3 g/cm³, greater than or equal to 2.0 g/cm³ to less than or equal to 2.2 g/cm³, or greater than or equal to 2.0 g/cm³ to less than or equal to 2.1 g/cm³, and all ranges and subranges therebetween.

Another advantageous property of the glass ceramic according to embodiments is the coefficient of thermal expansion (CTE). The CTE of the glass ceramic may stay relatively constant at high temperatures. In embodiments, the CTE of the glass ceramic may be from greater than or equal to $48 \times 10^{-7}$/K to less than or equal to $52 \times 10^{-7}$/K, such as about $50 \times 10^{-7}$/K measured from 25° C. to 300° C. The CTE of the glass ceramic may, in embodiments, be from greater than or equal to $53 \times 10^{-7}$/K to less than or equal to $57 \times 10^{-7}$/K, such as about $55 \times 10^{-7}$/K measured from 25° C. to 700° C. Similarly, the CTE of the glass ceramic may, in embodiments, be from greater than or equal to $54 \times 10^{-7}$/K to less than or equal to $58 \times 10^{-7}$/K, such as about $56 \times 10^{-7}$/K measured from 25° C. to 900° C. Thus, the CTE is held relatively constant when measured at high temperatures, such as, for example, temperature greater than or equal to 700° C.

Glass ceramics having the above crystalline structures, features, and properties may be formed by using a glass frit that is made from a certain composition of precursor glasses. Without being bound to any particular theory, it is believed that by using glass frit, nucleation takes place at the surface of the frit particles that are employed as starting powder. Once the frit is formed, binders may be added to the frit to make a paste, which is then shaped to the desired form. Whereas the binders are eliminated by thermal treatment, further increases in temperature promote sintering and then crystallization. To obtain a nonporous material, the frit may be sintered before the onset of crystal growth, because the presence of crystals increases the material viscosity and prevents sintering. Details of the method and precursor materials for forming glass ceramics according to embodiments are provide below.

The glass ceramics described herein may be formed from precursor materials that include: $SiO_2$ in the range from greater than or equal to 15 mol % to less than or equal to 37 mol %, $Al_2O_3$ in the range from greater than or equal to 40 mol % to less than or equal to 47 mol %, and CaO in the range from greater than or equal to 20 mol % to less than or equal to 30 mol %. Silica, alumina, and calcium oxide are the main components of the yoshiokaite crystalline structure and, in embodiments, must be precisely balanced to ensure that yoshiokaite is formed. For instance, if silica, alumina, and calcium oxide are added in amounts outside of the above disclosed ranges, crystalline structures other than yoshiokaite may be formed in significant amounts.

In addition to silica, alumina, and calcium oxide, additives may be added in embodiments to provide certain physical, mechanical, electrical, optical or thermal properties to the glass ceramic. These addition components include $Na_2O$ in the range from greater than or equal to 0 mol % to less than or equal to 7 mol %, and $ZrO_2$ in the range from greater than or equal to 0 mol % to less than or equal to 15 mol %. Other components such as MgO, BaO, SrO, $K_2O$, $TiO_2$, and the like can be added in low amounts (such as, for example, <5 wt. % each, <20 wt. % in total).

In one or more embodiments, the amount of $SiO_2$ in the compositions of the precursor materials and/or glass ceramics may be in the range from greater than or equal to 15 mol % to less than or equal to 37 mol %, such as greater than or equal to 17 mol % to less than or equal to 35 mol %, greater than or equal to 19 mol % to less than or equal to 33 mol %, greater than or equal to 21 mol % to less than or equal to 31 mol %, greater than or equal to 23 mol % to less than or equal to 29 mol %, or greater than or equal to 25 mol % to less than or equal to 27 mol %, and all ranges and subranges therebetween. In other embodiments, the amount of $SiO_2$ in the compositions of the precursor materials and/or glass ceramics may be in the range from greater than or equal to 20 mol % to less than or equal to 30 mol %, such as greater than or equal to 22 mol % to less than or equal to 30 mol %, greater than or equal to 24 mol % to less than or equal to 30 mol %, greater than or equal to 26 mol % to less than or equal to 30 mol %, or greater than or equal to 28 mol % to less than or equal to 30 mol %. In still other embodiments, the amount of $SiO_2$ in the compositions of the precursor materials and/or glass ceramics may be in the range from greater than or equal to 20 mol % to less than or equal to 28 mol %, such as greater than or equal to 20 mol % to less than or equal to 26 mol %, greater than or equal to 20 mol % to less than or equal to 24 mol %, or greater than or equal to 20 mol % to less than or equal to 22 mol % and all ranges and subranges therebetween.

In one or more embodiments, the amount of $Al_2O_3$ in the compositions of the precursor materials and/or glass ceramics may be in the range from greater than or equal to 40 mol % to less than or equal to 47 mol %, such as greater than or equal to 41 mol % to less than or equal to 47 mol %, greater than or equal to 42 mol % to less than or equal to 47 mol %, greater than or equal to 43 mol % to less than or equal to 47 mol %, greater than or equal to 44 mol % to less than or equal to 47 mol %, greater than or equal to 45 mol % to less than or equal to 47 mol %, or greater than or equal to 46 mol % to less than or equal to 47 mol % and all ranges and subranges therebetween. In other embodiments, the amount of $Al_2O_3$ in the compositions of the precursor materials and/or glass ceramics may be in the range from greater than or equal to 40 mol % to less than or equal to 46 mol %, such as greater than or equal to 40 mol % to less than or equal to 45 mol %, greater than or equal to 40 mol % to less than or equal to 44 mol %, greater than or equal to 40 mol % to less than or equal to 43 mol %, greater than or equal to 40 mol % to less than or equal to 42 mol %, or greater than or equal to 40 mol % to less than or equal to 41 mol % and all ranges and subranges therebetween.

In one or more embodiments, the amount of CaO in the compositions of the precursor materials and/or glass ceramics may be in the range from greater than or equal to 20 mol % to less than or equal to 30 mol %, such as greater than or equal to 22 mol % to less than or equal to 30 mol %, greater than or equal to 24 mol % to less than or equal to 30 mol %, greater than or equal to 26 mol % to less than or equal to 30 mol %, or greater than or equal to 28 mol % to less than or equal to 30 mol % and all ranges and subranges therebetween. In other embodiments, the amount of CaO in the compositions of the precursor materials and/or glass ceramics may be in the range from greater than or equal to 20 mol % to less than or equal to 28 mol %, such as greater than or equal to 20 mol % to less than or equal to 26 mol %, greater than or equal to 20 mol % to less than or equal to 24 mol %, or greater than or equal to 20 mol % to less than or equal to 22 mol %, and all ranges and subranges therebetween.

In one or more embodiments, $Na_2O$ may be included as an additive in compositions of the precursor materials and/or glass ceramics in the range from greater than or equal to 0 mol % to less than or equal to 7 mol %, such as greater than or equal to 1 mol % to less than or equal to 6 mol %, greater than or equal to 2 mol % to less than or equal to 5 mol %, or greater than or equal to 3 mol % to less than or equal to 4 mol %. If the amount of $Na_2O$ added to the precursor materials is above 7 mol %, a nepheline crystalline phase may be formed in place of the yoshiokaite crystalline phase.

In some embodiments, $ZrO_2$ may be included as an additive in compositions of the precursor materials and/or glass ceramics, according to embodiments, in the range from greater than or equal to 0 mol % to less than or equal to 15 mol %, such as greater than or equal to 2 mol % to less than or equal to 14 mol %, greater than or equal to 4 mol % to less than or equal to 12 mol %, greater than or equal to 6 mol % to less than or equal to 10 mol %, or about 8 mol %.

Manufacturing glass ceramics from glass frits requires not only melting and milling the glass into powder, but also pre-forming a pre-shaped/pressed body of the powder and densifying and crystallizing it. Accordingly, in one or more embodiments, successful processing of glass ceramics from a frit requires an engineered ceram cycle with tuned sintering and crystallization. For example, in embodiments, if the sintering step occurs much earlier than the crystallization step, then the behavior is close to the traditional ceramming of a dense bulk glass. However, in other embodiments, if the crystallization step occurs much earlier than the sintering step, then the crystallized body may not sinter to full density and remain porous. This process is described in more detail below.

In one or more embodiments, a glass melt is prepared by melting the precursor materials—such as the precursor materials and amounts of precursor materials disclosed above—by conventional glass melting methods. For instance, in embodiments, the precursor materials are mixed together in a platinum crucible and placed into an oven that has been preheated to a temperature from 1350° C. to 1550° C., such as from 1400° C. to 1500° C., or about 1450° C. Subsequently, the precursor materials are heated from the pre-heating temperature to a temperature of about 1650° C. This heating may be done rapidly, such as in about 10 minutes to 30 minutes, or more slowly, such as in about two to three hours. Once heated to about 1650° C., the precursor materials may be held at 1650° C. for two to three hours to completely melt the precursor materials. It should be understood that although exemplary heating temperatures and times for melting the precursor materials are provided above, the method for melting the precursor materials is not limited and any suitable method that provides a melt can be used regardless of temperatures and heating times.

In some embodiments, the melt may be formed into glass pellets by pouring the melt into a cold, small frame. In some embodiments, the small bulk glass pellets may be post-annealed for relaxation of residual stresses. In other embodiments, the glass may be formed into a glass frit by pouring the melt into water, so that glass shards may be obtained. These glass shards or formed glass pellets may be milled to into frit having particle size ranges from greater than or equal to 20 μm to less than or equal to 50 μm, such as greater than or equal to 25 μm to less than or equal to 45 μm, greater than or equal to 30 μm to less than or equal to 40 μm, or about 35 μm. For instance, in some embodiments, to form glass frits the glass shards or pellets may be ball-milled for a duration of from greater than or equal to 6 hours to less than or equal to 10 hours, such as about 8 hours and then sieved through an appropriate sieve. Although specific particle size distributions and ball-milling time are disclosed above, it should be understood that different particle size distributions and ball-milling times may be used according to embodiments.

To prepare for the ceram, or sintering cycle, in embodiments, the glass frit formed as described above were cold-pressed under pressures from greater than or equal to 0.5 bar to less than or equal to 2.0 bar, such as from greater than or equal to 0.5 bar to less than or equal to 1.5 bar, or about 1.0 bar. This pressing of the glass frit forms frit pellets having diameters from greater than or equal to 2 mm to less than or equal to 10 mm, such as greater than or equal to 3 mm to less than or equal to 9 mm, greater than or equal to 4 mm to less than or equal to 8 mm, or greater than or equal to 5 mm to less than or equal to 7 mm and all ranges and subranges therebetween. Although specific sizes of the glass frit pellets are disclosed above, it should be understood that frit pellets of different sizes may be formed according to embodiments.

Although the ceram process will vary depending on the composition and the size of the pieces being treated in embodiments, the duration of the ceram process may be from greater than or equal to 1 hour to less than or equal to 24 hours, such as greater than or equal to 2 hour to less than or equal to 22 hours, greater than or equal to 3 hour to less than or equal to 20 hours, greater than or equal to 4 hour to less than or equal to 18 hours, greater than or equal to 6 hour to less than or equal to 16 hours, greater than or equal to 7 hour to less than or equal to 14 hours, greater than or equal to 8 hour to less than or equal to 12 hours, or greater than or equal to 9 hour to less than or equal to 11 hours and all ranges and subranges therebetween. The temperature of the ceram process, in embodiments, may be from greater than or equal to 600° C. to less than or equal to 1200° C., such as greater than or equal to 650° C. to less than or equal to 1150° C., greater than or equal to 700° C. to less than or equal to 1100° C., greater than or equal to 750° C. to less than or equal to 1050° C., greater than or equal to 800° C. to less than or equal to 1000° C., or greater than or equal to 850° C. to less than or equal to 950° C. It should be understood that as used herein, the "ceram process" may include both sintering and crystallization.

The composition of the glass frit is selected so that there is a large gradient between the $T_g$ of the glass frit and the crystallization temperature of the glass frit, i.e., the crystallization temperature of the main crystalline phase of the glass frit. This allows for the glass frit to completely sinter before crystallization begins. However, if the difference between the $T_g$ and the temperature of crystallization is too large, the glass flow before crystallization can lead to an excessive softening of the material and it becomes very difficult to keep the shape of the initial piece. Thus, the difference between the $T_g$ and the temperature of crystallization is, in one or more embodiments, balanced to achieve the proper balance of sintering and hardness. With the above in mind, in embodiments, the difference between the crystallization temperature of the main crystalline phase of the glass frit and the $T_g$ of the glass frit is greater than 120° C., such as greater than 130° C., greater than 140° C., greater than 150° C., greater than 160° C., greater than 170° C., or greater than 180° C. This difference may be measured by from differential scanning calorimetry (DSC) measurements with a heating rate of 10° C./min.

In addition to the above, embodiments where the glass ceramics are made from frit, processes such as, for example, rolling, pressing, molding, additive manufacturing, casting, tape casting, and printing allow the glass ceramic to be formed into complex shapes.

Forming a glass ceramic from glass frit as opposed to forming glass ceramics from bulk glass will cause the crystalline structure of the glass ceramic to have boundaries that form along or in the network of the frit particle contact surfaces and remain even after sintering and densification. These boundaries are visible in many glass ceramics due to discontinuities in crystal structure, microstructure or chemistry and due to segregation and exsolution processes during crystallization and ceramming, so that they form a 3D "ghost" network. The "ghost network" has similarities to a grain boundary network, but scales at the level of the frit particle, Accordingly, a ghost boundary can, for example, separate two welded, crystallized glass frit particles which have formed by crystallization and sintering in the ceram process from two frit particles. In embodiments comprising a sintered frit compact, the frit boundaries constitute a 3D continuous network. These ghost networks may be decorated with various differing components, such as, for example, zircon and sodium, to improve the electrical, thermal, and physical properties of the glass ceramic.

The glass ceramic materials disclosed and described herein can be used in electronic and non-electronic applications, and in touch applications. Additional uses of glass ceramic composites disclosed and described herein include use as electronic circuit boards, such as by acting as the conductive through-board via. In some embodiments, an electronic device, comprises: electrical components; and a glass ceramic material component electrically connected to the electrical components, wherein the glass ceramic material comprises: a residual glass; and a crystalline phase comprising a yoshiokaite phase, wherein the yoshiokaite phase constitutes a main crystalline phase of the glass ceramic material.

The glass ceramic materials disclosed and described herein can also be formed into complex shapes using three dimensional (3D) printing techniques. Because the glass ceramic materials disclosed and described herein start from glass frits they may be used in 3D printing processes to form glass ceramic articles having complex shapes. For instance, the small frit particles may be applied to one another forming a desired shape using conventional 3D printing techniques. It should be understood that the frit particles may, in some embodiments, need to be added to a liquid carrier, a binder, or other additives to aid in the 3D printing process. Once the frit particles are applied in a desired shape, they may be sintered using the sintering processes outlined above to form a glass ceramic article having the desired shape.

A first clause includes a glass ceramic material, comprising: an amorphous glass phase; and a crystalline phase comprising a yoshiokaite phase, wherein the yoshiokaite phase constitutes a main crystalline phase of the glass ceramic material.

A second clause includes the glass ceramic material of the first clause, wherein the crystalline phase comprises one or more of an anorthite phase, a gehlenite phase, a nepheline phase, and a cubic zirconia phase.

A third clause includes the glass ceramic material of any one of the first and second clauses, wherein the yoshiokaite phase comprises greater than or equal to 55 wt. % of the crystalline phase.

A fourth clause includes the glass ceramic material of any one of the first to third clauses, wherein the yoshiokaite phase comprises greater than or equal to 80 wt. % of the crystalline phase.

A fifth clause includes the glass ceramic material of any one of the first to fourth clauses, wherein the yoshiokaite phase comprises greater than or equal to 90 wt. % of the crystalline phase.

A sixth clause includes the glass ceramic material of any one of the first to fifth clauses, wherein the yoshiokaite phase comprises yoshiokaite crystals having an average crystal size from greater than or equal to 100 nm to less than or equal to 160 nm.

A seventh clause includes the glass ceramic material of any one of the first to sixth clauses, wherein the yoshiokaite phase comprises yoshiokaite crystals having an average crystal size from greater than or equal to 130 nm to less than or equal to 160 nm.

An eighth clause includes the glass ceramic material of any one of the first to seventh clauses, wherein the glass ceramic material is comprised of greater than or equal to 80 wt. % of the crystalline phase.

A ninth clause includes the glass ceramic material of any one of the first to eighth clauses, wherein the glass ceramic material is comprised of greater than or equal to 95 wt. % of the crystalline phase.

A tenth clause includes the glass ceramic material of any one of the first to ninth clauses, wherein the glass ceramic material has a density of greater than or equal to 2.0 g/cm$^3$.

An eleventh clause includes the glass ceramic material of any one of the first to tenth clauses, wherein the glass ceramic material has a density of greater than or equal to 2.0 g/cm$^3$ to less than or equal to 3.0 g/cm$^3$.

A twelfth clause includes the glass ceramic material of any one of the first to eleventh clauses, wherein the glass ceramic material comprises less than or equal to 20 wt. % of a residual glass.

A thirteenth clause includes a method for forming a glass ceramic material, comprising:

heat treating a frit glass to form the glass ceramic material, wherein the frit glass comprises: SiO$_2$ in a range from greater than or equal to 15 mol % to less than or equal to 37 mol %; Al$_2$O$_3$ in a range from greater than or equal to 40 mol % to less than or equal to 47 mol %; and CaO in a range from greater than or equal to 20 mol % to less than or equal to 30 mol %; and wherein the glass ceramic material comprises: an amorphous glass phase; and a crystalline phase comprising a yoshiokaite phase, wherein the yoshiokaite phase constitutes a main crystalline phase of the glass ceramic material.

A fourteenth clause includes the method of the thirteenth clause, wherein heat treating the frit glass comprises sintering the frit glass and crystallizing the frit glass.

A fifteenth clause includes the method of any one of the thirteenth and fourteenth clauses, wherein the frit glass comprises: from greater than or equal to 20 mol % to less than or equal to 30 mol % SiO$_2$; from greater than or equal to 40 mol % to less than or equal to 47 mol % Al$_2$O$_3$; and from greater than or equal to 20 mol % to less than or equal to 30 mol % CaO.

A sixteenth clause includes the method of any one of the thirteenth to fifteenth clauses, wherein the glass ceramic material comprises a density greater than or equal to 2.0 g/cm$^3$.

A seventeenth clause includes the method of any one of the thirteenth to sixteenth clauses, wherein a difference between a crystallization temperature of the main crystalline phase and a glass transition temperature of the frit glass is greater than or equal to 120° C.

An eighteenth clause includes the method of any one of the thirteenth to seventeenth clauses, wherein a difference between a crystallization temperature of the main crystalline phase and a glass transition temperature of the frit glass is greater than or equal to 140° C.

A nineteenth clause includes the method of any one of the thirteenth to eighteenth clauses, wherein the heat treating frit glass comprises heating to temperatures from greater than or equal to 600° C. to less than or equal to 1200° C.

A twentieth clause includes an electronic device, comprising: electrical components; and a glass ceramic material component comprising the glass ceramic material of any one of the first through twelfth clauses electrically connected to the electrical components.

EXAMPLES

Embodiments will be further clarified by the following example.

Precursor materials were mixed together in a platinum crucible in amounts as shown in Table 1 below. The compositions listed in Table 1 are provided in wt. %.

TABLE 1

| | Example Compositions | | | | |
| --- | --- | --- | --- | --- | --- |
| | Sample | | | | |
| | 1 | 2 | 3 | 4 | 5 |
| SiO$_2$ | 27.55 | 27.60 | 27.60 | 35.51 | 27.48 |
| Al$_2$O$_3$ | 46.74 | 44.70 | 44.70 | 41.61 | 44.52 |
| CaO | 25.71 | 27.70 | 27.70 | 22.88 | 23.71 |
| Na$_2$O | | | | | 4.30 |
| ZrO$_2$ | | | | | |
| T$_g$ (° C.) | | 847 | | 846 | 798 |
| Temp. of Crystallization Onset (° C.) | | 1008 | | 999 | 938 |
| Temp. of Crystallization Max (° C.) | | 1028 | | 1049 | 973 |
| Onset Temp. − T$_g$ | | 161 | | 153 | 140 |

TABLE 1-continued

Example Compositions

| Ceramming | 5 h at 950° C. | 5 h at 950° C. | 5 h at 950° C. and 5 h at 1100° C. | 5 h at 960° C. | 5 h at 960° C. |
|---|---|---|---|---|---|
| Density after ceramming | | 2.7 | 2.67 | | |
| Crystalline Phases | Yoshiokaite | Yoshiokaite | Yoshiokaite, Anorthite. Gehlenite. | Anorthite, Yoshiokaite. | Yoshiokaite, Nepheline, Gehlenite. |

| | Sample | | | |
|---|---|---|---|---|
| | 6 | 7 | 8 | 9 |
| $SiO_2$ | 25.82 | 25.02 | 25.02 | 24.27 |
| $Al_2O_3$ | 41.83 | 40.53 | 40.53 | 39.31 |
| CaO | 25.93 | 25.12 | 25.12 | 24.36 |
| $Na_2O$ | | | | |
| $ZrO_2$ | 6.42 | 9.33 | 9.33 | 12.06 |
| $T_g$ (° C.) | 835 | 836 | | |
| Temp. of Crystallization Onset (° C.) | 1012 | 1014 | | |
| Temp. of Crystallization Max (° C.) | 1048 | 1042 | | |
| Onset Temp. – $T_g$ | 177 | 178 | | |
| Ceramming | 3 h at 890° C. and 3 h at 960° C. | 5 h at 960° C. | 3 h at 890° C. and 3 h at 960° C. | 3 h at 890° C. and 3 h at 960° C. |
| Density after ceramming | | 2.86 | 2.84 | |
| Crystalline Phases | Yoshiokaite, Cubic Zirconia. | Yoshiokaite, Cubic Zirconia. | Yoshiokaite, Cubic Zirconia. | Yoshiokaite, Cubic Zirconia. |

| | Sample | | |
|---|---|---|---|
| | C1 | C2 | C3 |
| $SiO_2$ | 36.09 | 27.79 | 27.37 |
| $Al_2O_3$ | 38.64 | 48.55 | 44.33 |
| CaO | 25.26 | 23.65 | 19.74 |
| $Na_2O$ | | | 8.56 |
| $ZrO_2$ | | | |
| $T_g$ (° C.) | 831 | | |
| Temp. of Crystallization Onset (° C.) | 991 | | |
| Temp. of Crystallization Max (° C.) | 1059 | | |
| Onset Temp. – $T_g$ | 160 | | |
| Ceramming | 5 h at 960° C. | Devitrification | 5 h at 960° C. |
| Crystalline Phases | Anorthite, Gehlenite. | | Nepheline, Gehlenite. |

Two melting cycles were used according to the amount of glass necessary for the experiments. Both of the cycles, which are provided below led to glasses with the same properties.

Cycle 1:

250 g of raw materials were melted in a platinum crucible with the following cycle: introduction in a furnace preheated at 1500° C.; heating in 10 min from 1500° C. to 1650° C.; and melting 2 hours at 1650° C.

Cycle 2:

1200 g of raw materials were melted in a platinum crucible with the following cycle: introduction in the furnace preheated at 1400° C.; heating in 3 hours from 1400° C. to 1650° C.; and melting 3 hours at 1650° C.

The melted glasses were then poured into water to form glass shards. The glass shards were then milled and sieved in order to obtain frit glass with particle sizes ranging from 20 μm to 50 μm.

The crystallization ability of the frit glass was studied by DSC with a heating rate of 10° C./min. A typical example of the DSC analysis is given on FIG. 1, the main exothermic peak observed in Sample 2 is attributed to yoshiokaite formation. The addition of $ZrO_2$ (Samples 7-9) leads to the appearance of a smaller exothermic peak at a lower temperature attributed to the precipitation of $ZrO_2$. $ZrO_2$ crystallizes in amounts small enough to have no influence on the sintering ability. $T_g$ and crystallization temperature are reported in Table 1. When several phases crystallize, the indicated temperatures in Table 1 correspond to the most intense peak.

Figure 2:
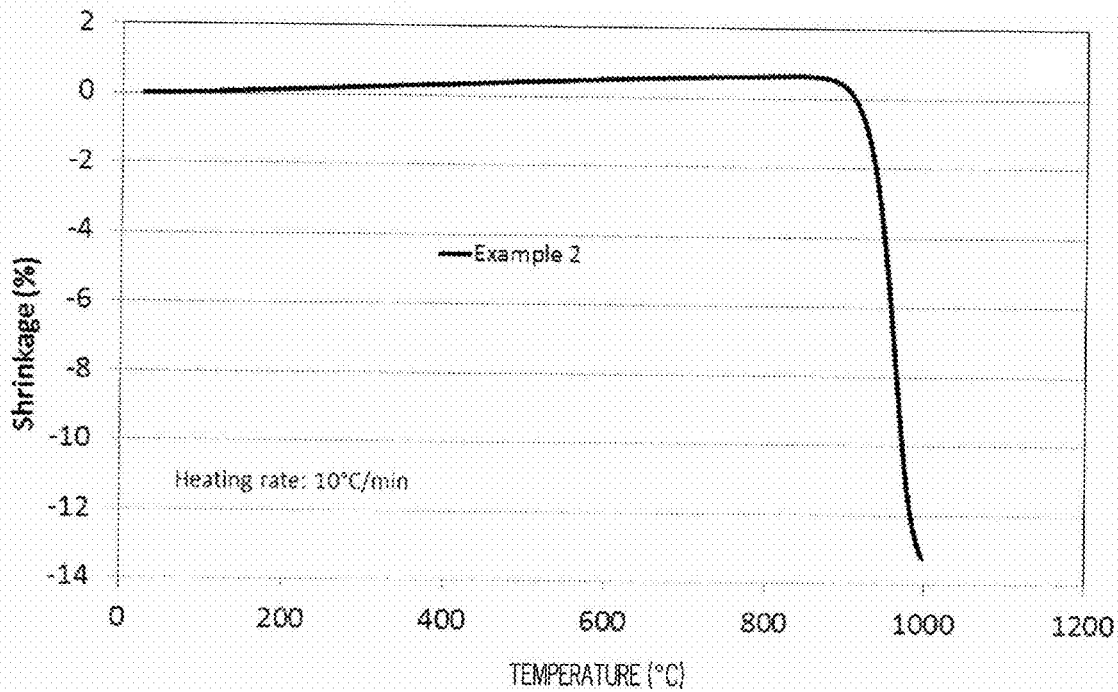
FIG. 2 is a TMA curve of glass ceramics according to embodiments disclosed and described herein.

The sintering ability of the frit glass was studied by thermomechanical analysis (TMA) on a cold-pressed frit pellets (5 mm diameter rods) with a heating rate of 10° C./min. A typical example is given on FIG. 2, which shows the total shrinkage is around 13%. The experiments performed on pellets have shown that glasses which present this amount of shrinkage in the TMA experiments allows to obtain dense glass-ceramics.

Frits were then cold-pressed into pellets of diameter between 5 mm and 40 mm and thickness between 2 mm and 5 mm. To obtain the glass-ceramics, the pellets were then subjected to ceramming in air as indicated in Table 1 where the heating rates were always 10° C./min.

Phase assemblages were studied by x-ray diffraction (XRD) analysis. In some cases Rietveld analysis was performed in order to quantify the respective percentages of the crystalline phases and the mean size of the crystallites. The amount of residual glass is not taken into account. Table 2 below shows the data obtained from the Rietveld analysis. A Philips X'Pert Pro diffractometer (Co Kα radiation) was used for X-ray diffraction. Spectra were acquired from 20 to 100° (2θ).

observed around 960° C. before the peak attributed to the crystallization of yoshiokaite. This peak has been attributed to $ZrO_2$ precipitation.

In some cases coefficient of thermal expansion and modulus of rupture were measured on the glass-ceramics.

The coefficient of thermal expansion (CTE) of example 2 has been measured. The obtained values are: $50 \times 10^{-7} K^{-1}$ between 25 and 300° C., $55 \times 10^{-7} K^{-1}$ between 25 and 700° C., $56 \times 10^{-7} K^{-1}$ between 25 and 900° C.

Figure 5:
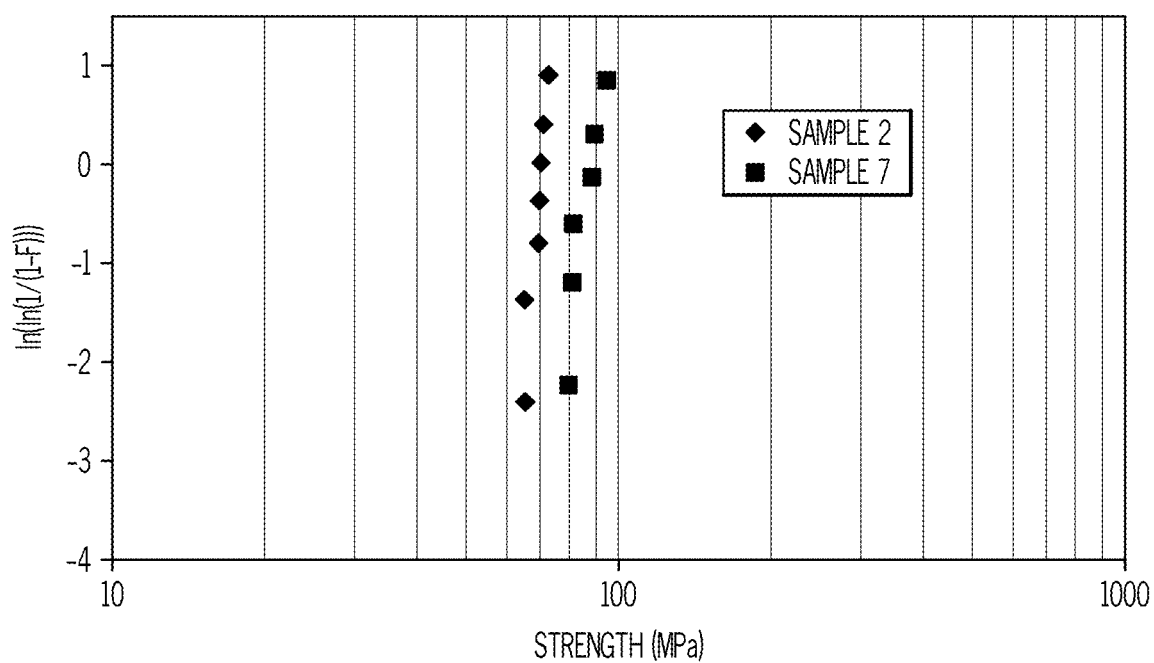
FIG. 5 is a graphical depiction of the results of a ring-on-ring test conducted on glass ceramics according to embodiments disclosed and described herein.

FIG. 5 shows the ring-on-ring (ROR) stress at failure distribution of glass ceramics of Sample 3, which does not contain $ZrO_2$, and Sample 7, which contains $ZrO_2$. The measurements were made on samples with a diameter of 32 mm and a thickness of 2.1 mm. The strength of a material is defined as the stress at which fracture occurs. The ROR test is a surface strength measurement for testing flat glass ceramic specimens, and ASTM C1499-09(2013), entitled "Standard Test Method for Monotonic Equibiaxial Flexural Strength of Advanced Ceramics at Ambient Temperature," serves as the basis for the ROR test methodology described herein. The contents of ASTM C1499-09 are incorporated herein by reference in their entirety. For the ROR test, a

TABLE 2

Rietveld Test Results

| | Sample | | | | |
|---|---|---|---|---|---|
| | 3 | 6 | 7 | 8 | 9 |
| $SiO_2$ | 27.60 | 25.82 | 25.02 | 25.02 | 24.27 |
| $Al_2O_3$ | 44.70 | 41.83 | 40.53 | 40.53 | 39.31 |
| CaO | 27.70 | 25.93 | 25.12 | 25.12 | 24.36 |
| $Na_2O$ | | | | | |
| $ZrO_2$ | | 6.42 | 9.33 | 9.33 | 12.06 |
| Ceramming | 5 h at 950° C. and 5 h at 1100° C. | 3 h at 890° C. and 3 h at 960° C. | 5 h at 960 | 3 h at 890° C. and 3 h at 960° C. | 3 h at 890° C. and 3 h at 960° C. |
| Phase 1 | Yoshiokaite | Yoshiokaite | Yoshiokaite | Yoshiokaite | Yoshiokaite |
| Amount (%) | 81.00 | 91.90 | 89.30 | 89.00 | 87.00 |
| Mean Crystal Size (nm) | 128 | 115 | 138 | 126 | 156 |
| Phase 2 | Anorthite | Cubic Zirconia | Cubic Zirconia | Cubic Zirconia | Cubic Zirconia |
| Amount (%) | 10.20 | 2.50 | 9.40 | 10 | 12 |
| Mean Crystal Size (nm) | 28 | 24 | 26 | 26 | 13 |
| Phase 3 | Gehlenite | | | | |
| Amount (%) | 7.30 | | | | |
| Mean Crystal Size (nm) | 40 | | | | |
| Minor Phases (<6%) | Corundum, Cristobalite. | Quartz | Quartz | Quartz | Quartz |

Figure 3:
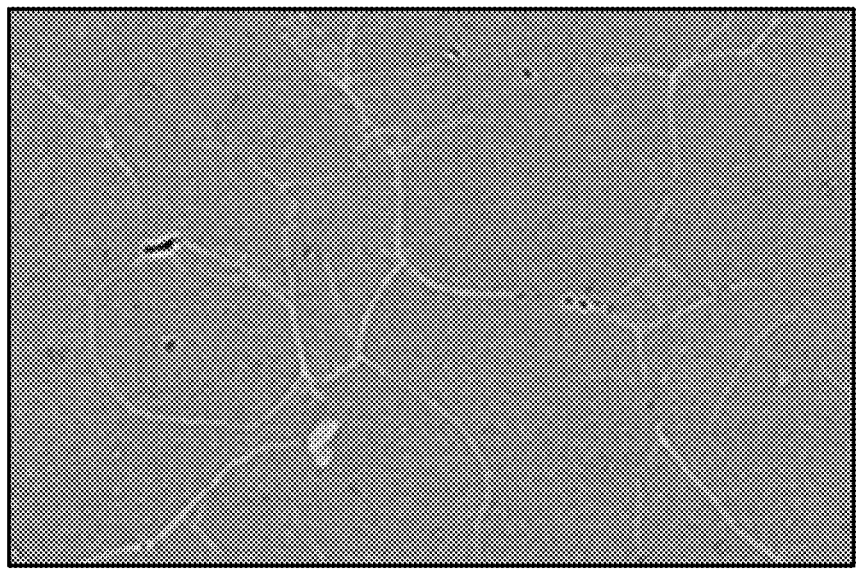
FIG. 3 is an SEM photograph of glass ceramics according to embodiments disclosed and described herein.
Figure 4:
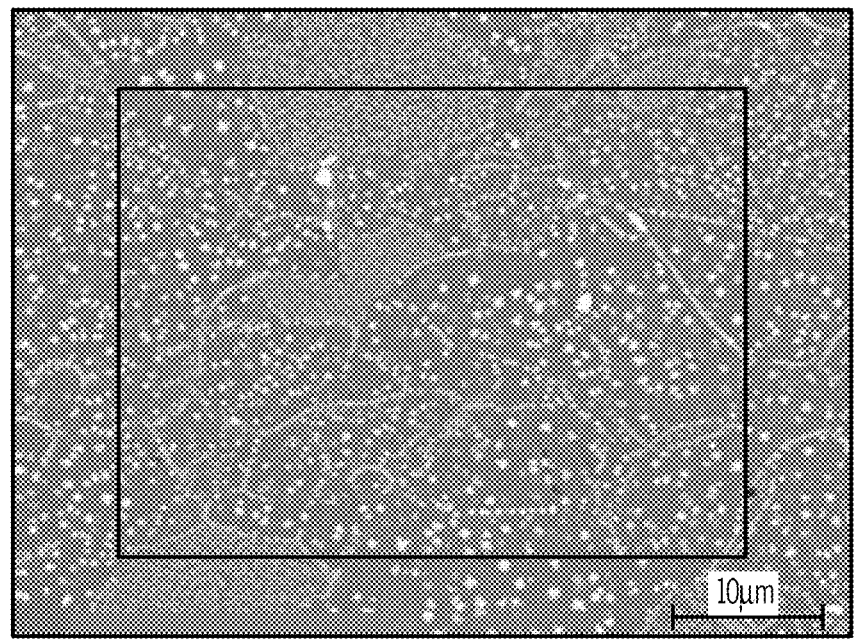
FIG. 4 is an SEM photograph of glass ceramics including zirconia according to embodiments disclosed and described herein.

Scanning electron microscope (SEM) analysis was performed in some cases to observe the microstructure. FIG. 3 is an SEM of a yoshiokaite glass-ceramic after 5 h at 960° C. (Sample 2). This material had been obtained from a pellet by surface nucleation. The boundaries between the crystals show brighter contrast because of CaO enrichment in the grain boundaries. FIG. 4 is an SEM of a yoshiokaite glass-ceramic containing $ZrO_2$ after 5 h at 960° C. (Sample 7). This material has been obtained from a pellet by surface nucleation. The white spots with a star shape and a size lower than 1 μm are zirconia crystals.

When zirconia is added to the precursor materials, a precipitation of $ZrO_2$ (cubic form) is observed. This phase could also contain some CaO which stabilizes it. DSC of Samples 7 and 9 are given in FIG. 1, in comparison with Sample 2 it is observed that a small exothermic peak is glass ceramic was placed between two concentric rings of differing size to determine equibiaxial flexural strength (i.e., the maximum stress that a material is capable of sustaining when subjected to flexure between two concentric rings). The ratio of diameters of the loading ring and support ring D1/D2 may be in a range from 0.2 to 0.5. In some embodiments, D1/D2 is 0.5. Loading and support rings should be aligned concentrically to within 0.5% of support ring diameter D2. The load cell used for testing should be accurate to within ±1% at any load within a selected range. Testing is carried out at a temperature of 23±2° C. and a relative humidity of 40±10%. For fixture design, the radius r of the protruding surface of the loading ring 430 is in a range of h/2≤r≤3 h/2, where h is the thickness of glass ceramic sample. Loading and support rings were made of hardened steel with hardness HRc>40. ROR fixtures are commercially available. A probability distribution can be used as a statistical representation of the data obtained. The Weibull scale parameters corresponding to 63.2% of failure probability are respectively 70 MPa and 89 MPa. The Weibull shape parameters are respectively 26 and 14. These results demonstrate an increase of the strength when $ZrO_2$ is added.

It should be understood that in this disclosure, the used of ranges should be read to include the recited ranges including all ranges and sub-ranges there between.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass ceramic material obtained from glass frits, the glass ceramic material comprising:
   an amorphous glass phase and a crystalline phase, wherein:
      the crystalline phase constitutes 80 wt. % or more of the glass ceramic material, and
      the crystalline phase comprises 80 wt. % or more of a yoshiokaite phase.

2. The glass ceramic material of claim 1, wherein the crystalline phase comprises one or more of an anorthite phase, a gehlenite phase, a nepheline phase, and a cubic zirconia phase.

3. The glass ceramic material of claim 1, wherein the crystalline phase comprises 90 wt. % or more of the yoshiokaite phase.

4. The glass ceramic material of claim 1, wherein the yoshiokaite phase comprises yoshiokaite crystals having an average crystal size from greater than or equal to 100 nm to less than or equal to 160 nm.

5. The glass ceramic material of claim 1, wherein the yoshiokaite phase comprises yoshiokaite crystals having an average crystal size from greater than or equal to 130 nm to less than or equal to 160 nm.

6. The glass ceramic material of claim 1, wherein the crystalline phase constitutes 95 wt. % or more of the glass ceramic material.

7. The glass ceramic material of claim 1, wherein the glass ceramic material has a density of greater than or equal to 2.0 $g/cm^3$.

8. The glass ceramic material of claim 1, wherein the glass ceramic material has a density of greater than or equal to 2.0 $g/cm^3$ to less than or equal to 3.0 $g/cm^3$.

9. An electronic device, comprising:
   electrical components; and
   a glass ceramic material component comprising the glass ceramic material of claim 1 electrically connected to the electrical components.

10. The glass ceramic material of claim 1, wherein the crystalline phase comprises 85 wt. % or more of the yoshiokaite phase.

* * * * *

UNITED STATES PATENT AND TRADEMARK OFFICE
CERTIFICATE OF CORRECTION

PATENT NO. : 10,836,680 B2  
APPLICATION NO. : 16/108989  
DATED : November 17, 2020  
INVENTOR(S) : Marie Jacqueline Monique Comte Page 1 of 1

It is certified that error appears in the above-identified patent and that said Letters Patent is hereby corrected as shown below:

On the Title Page

In Column 2, item (56), Other Publications, Line 2, delete "Comosites" and insert -- Composites --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*